UNITED STATES PATENT OFFICE.

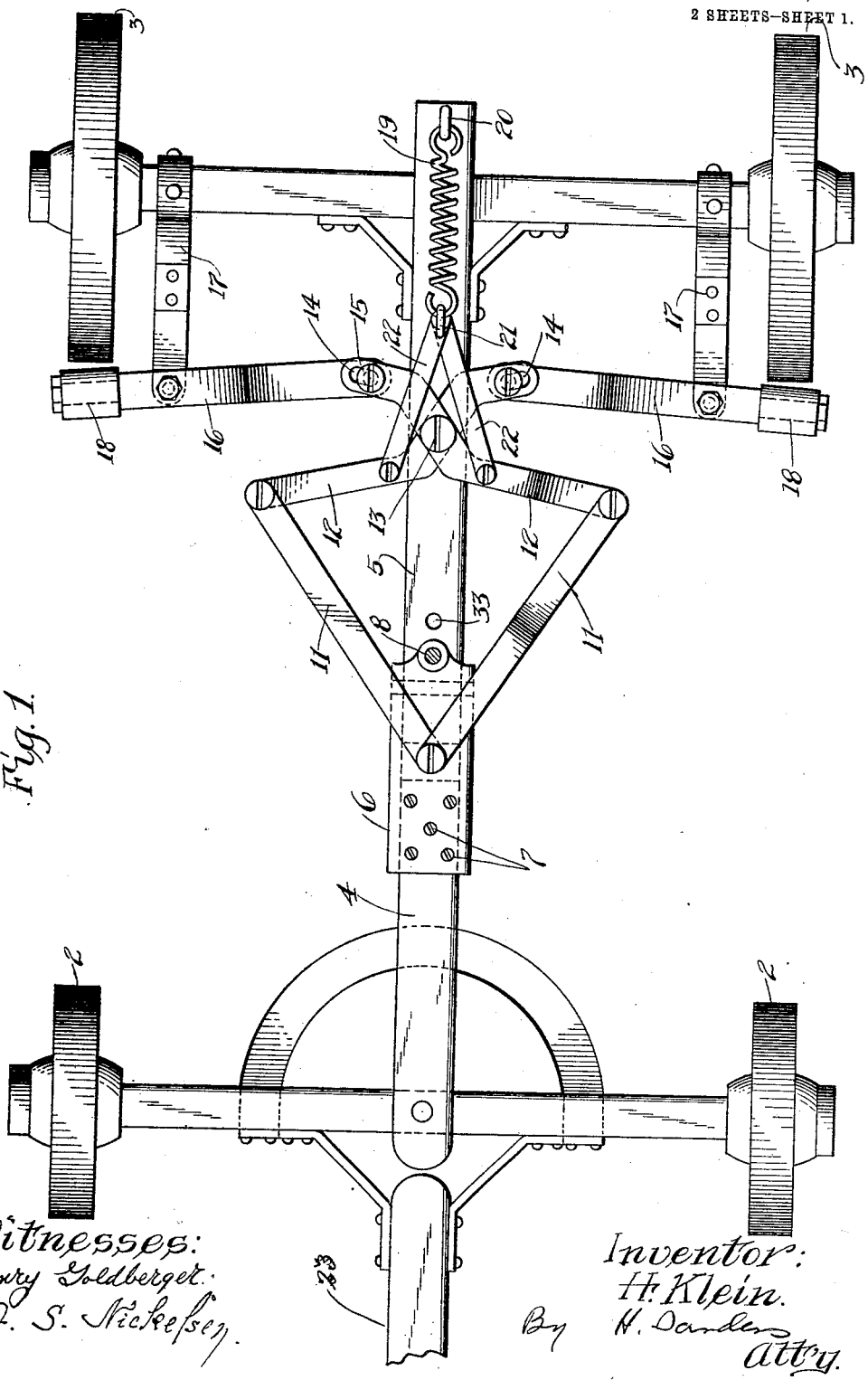

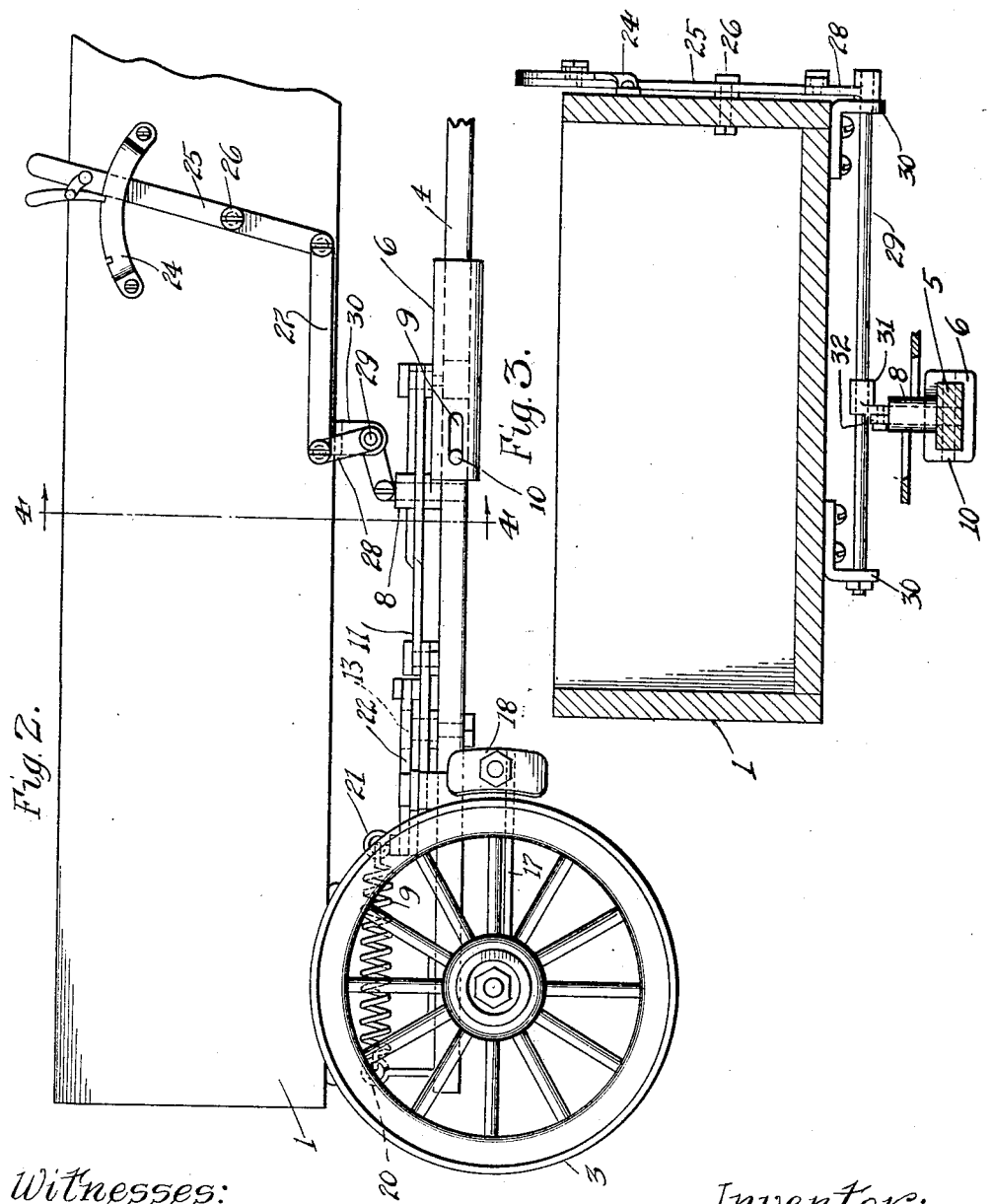

HANS KLEIN, OF OLIN, IOWA.

BRAKE.

1,118,021.  Specification of Letters Patent.  Patented Nov. 24, 1914.

Application filed June 17, 1914. Serial No. 845,570.

*To all whom it may concern:*

Be it known that I, HANS KLEIN, a citizen of the United States, residing at Olin, in the county of Jones and State of Iowa, have invented certain new and useful Improvements in Brakes, of which the following is a specification.

This invention relates to improvements in wagon brakes and more particularly to a wagon brake that will set automatically on down grades.

Means are provided whereby the mechanism can be locked in open position to prevent the brakes being set when not desired or when the team is backing up.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a plan of a vehicle, the vehicle body being removed, provided with my improved brake. Fig. 2 is a side elevation of a portion of a vehicle provided with my improved brake. Fig. 3 is a section taken on line 4—4 of Fig. 2.

Like reference characters indicate corresponding parts throughout the several views.

The reference numeral 1 indicates a vehicle having front wheels 2, 2 and rear wheels 3, 3 and the axles of said wheels are connected by the reach formed of two sections 4, 5. To the section 4 a casting 6 is secured by bolts 7 which casting projects over the adjacent end of the section 5 and is formed with a terminal boss 8 and with longitudinal slots 9 in its sides through which a pin 10 extends which pin also passes through the section 5 of the reach. To the casting 6 links 11, 11 are pivoted which pivotally engage the ends of angular levers 12, 12 which are pivoted to the reach at 13 and the opposite ends of said levers are formed with elongated slots 14 in which pins 15, 15 are disposed that are carried by brake rods 16, 16, that are fulcrumed upon arms 17, 17 carried by the rear vehicle axle, that carry the brake shoes 18, 18 adapted for engagement with the rims of the rear wheels 3, 3. A spring 19 secured at one end to an eyebolt 20 carried by the reach is connected at its opposite end to another eyebolt 21 to which links 22, 22 are secured that engage the levers 12, 12. When the team pulls upon the draw bar 23 the two-piece reach will tend to separate and the pin 10, by which section 5 of the reach is secured to casting 6, will be drawn to one end of the slot 9 retaining the reach sections in operative relation with each other but the maximum distance apart as best shown in Figs. 1 and 2. Should the vehicle start down hill the team will naturally resist the movement of the vehicle thus forcing the ends of the reach together and moving pin 10 to the opposite end of slot 9 and causing the links 11 to move the levers 12 upon their pivot in a direction to force the brake shoes against the wheels, through the medium of brake rods 16, 16, arresting the movement of the vehicle.

To one side of the vehicle body a rack 24 is secured over which a lever 25, pivoted at 26, works and said lever is connected by pitman 27 to a link 28 secured to a shaft 29, disposed in bearings 30, 30 secured to the vehicle body, and a link 31 carried by shaft 29 engages a pin 32 disposed in the boss 8 for locking engagement with either of the apertured portions 33 or 34 of the reach section 5. Normally the pin resides in the boss 8 but does not extend beyond the same but through the medium of lever 25 and connections the pin may be forced through the boss and into engagement with either of the apertured portions 33 or 34 of the reach section 5. In the former aperture 33 the mechanism will be locked with the brakes on while in the latter position the mechanism will be locked with the brakes in inoperative position.

What is claimed is:—

1. The combination with a vehicle having a two-piece reach, of a casting rigidly secured to one piece and movably secured to the other piece, brake rods pivotally supported and provided with brake shoes, levers pivotally engaging said brake rods and pivotally connected to one reach section and links connecting said levers and the said casting.

2. The combination with a vehicle having a two-piece reach, of a casting rigidly secured to one piece and movably secured to the other piece, brake rods pivotally supported and provided with brake shoes, levers pivotally engaging said brake rods and pivotally connected to one reach section, links connecting said levers and said casting and a spring operatively associated with said reach section and the aforesaid levers.

3. The combination with a vehicle having a two-piece reach, of a casting rigidly secured to one piece and movably secured to the other piece, brake rods pivotally supported and provided with brake shoes, levers pivotally engaging said brake rods and pivotally connected to one reach section, links connecting said levers and the said casting and manually operable means carried by the vehicle body and operatively associated with the boss of said casting and with the last mentioned reach section whereby said casting and reach section may be positively locked together to retain the brake in set or released position as desired.

In testimony that I claim the foregoing as my own I have hereto affixed my signature in the presence of two subscribing witnesses.

HANS KLEIN.

Witnesses:
BEN H. CHAMBERLAIN,
J. S. ROBERTSON.

Copies of this patent may be obtained for five cents each, by addressing the "Commissioner of Patents, Washington, D. C."